(12) United States Patent  (10) Patent No.: US 7,376,326 B2
Corbeels  (45) Date of Patent: May 20, 2008

(54) FIBER OPTIC CABLE STACK MEASURING DEVICE

(75) Inventor: George A. Corbeels, Spring Lake Heights, NJ (US)

(73) Assignee: Verizon New Jersey Inc., Newark, NJ (US)

( * ) Notice: Subject to any disclaimer, the term of this patent is extended or adjusted under 35 U.S.C. 154(b) by 21 days.

(21) Appl. No.: 11/458,717

(22) Filed: Jul. 20, 2006

(65) Prior Publication Data

US 2008/0019654 A1   Jan. 24, 2008

(51) Int. Cl.
*G02B 6/00* (2006.01)
(52) U.S. Cl. ..................... 385/137; 385/135
(58) Field of Classification Search ........ 385/135–137; 242/529
See application file for complete search history.

(56) References Cited

U.S. PATENT DOCUMENTS 2,208,774 A * 7/1940 Pierson ..................... 33/701
5,681,131 A * 10/1997 Goldenberg et al. ..... 405/183.5

FOREIGN PATENT DOCUMENTS

DE           4021744        * 1/1992

* cited by examiner

*Primary Examiner*—Frank G. Font
*Assistant Examiner*—Charlie Peng

(57) ABSTRACT

During the stringing of fiber optic cable on utility poles, there is a need for making splices of that cable at each pole where a terminal is to be located for connection of that cable to, e.g., a house. Cable slack is needed for those splices, and certain lengths of slack are optimum. Apparatus and methodology for enabling a lineman to make accurate and convenient optimum length measurements of a slack portion of fiber optic cable during the stringing of the cable on utility poles is disclosed.

16 Claims, 4 Drawing Sheets

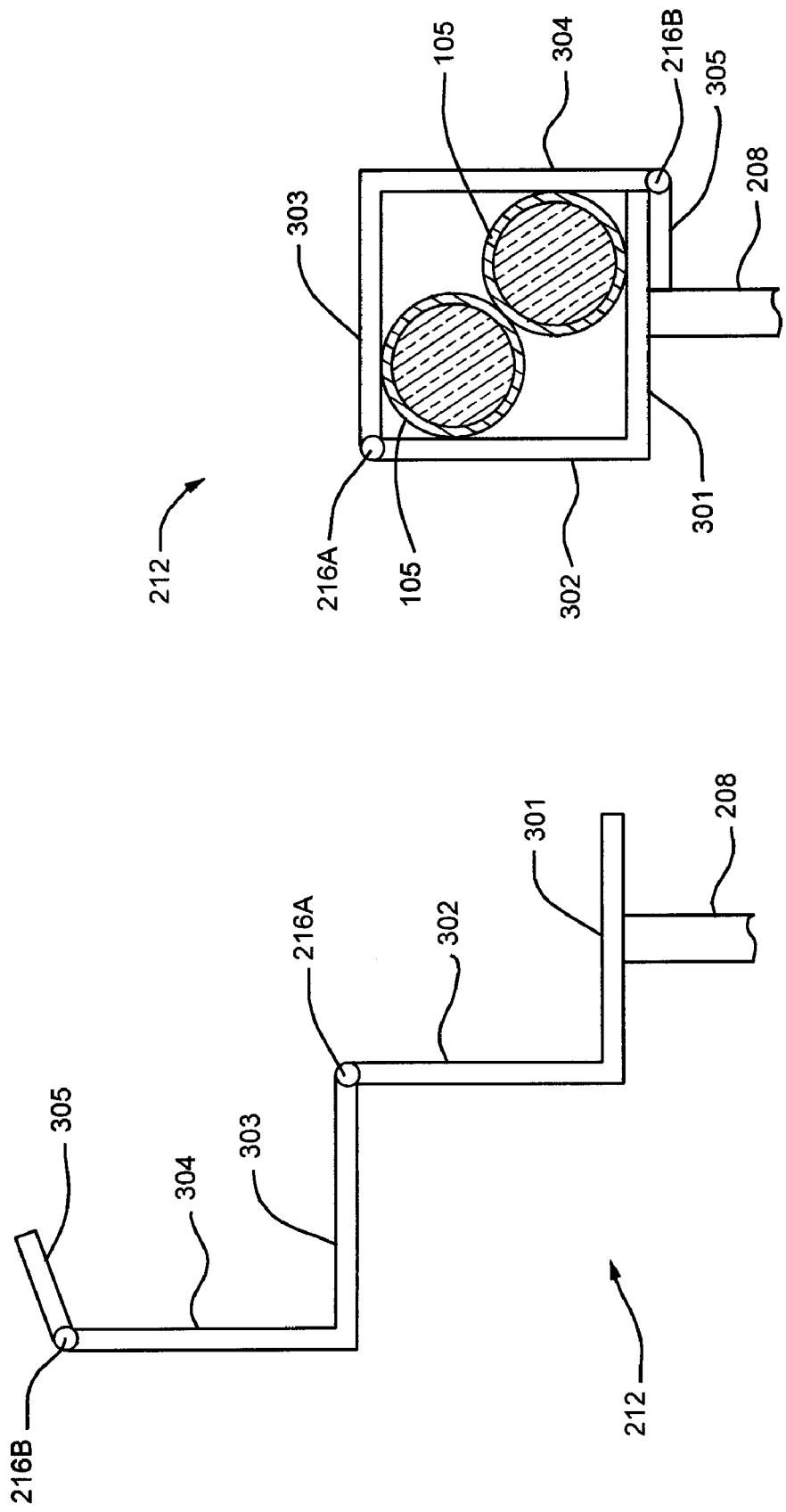

FIBER OPTIC CABLE STACK MEASURING DEVICE

BACKGROUND OF THE INVENTION

1. Field of the Invention

The present invention relates to installation of fiber optic cable on poles elevated above ground and, more particularly, relates to a safe and convenient technique for providing accurate cable slack lengths at certain locations along the path of that installation.

2. Description of Prior Art

In this modern world of improved communication, it is commonplace to see cables strung on utility poles, high above ground. These cables can be used for TV, telephone, fax, and/or Internet communication, etc. The latest kind of cable to be used for these communication purposes may be a fiber optic cable.

When fiber optic cable is used for this purpose, cable splicing is generally required at certain locations where the cable is to be communicatively-connected to a terminal, typically at the location of each utility pole and elevated above ground. To accomplish this, a certain amount of cable slack is required to be positioned at the top of each utility pole to enable the cable stringer (lineman or technician or installer), positioned high above ground, to make the appropriate splice. Based on experience, a certain amount of cable length slack is optimum for this splicing purpose, e.g., five feet of slack for a particular kind of fiber-optic cable.

Currently, the lineman merely guesses at this length or, if he/she has a tape measure, ruler, or other measuring device, attempts to make an accurate five-foot measurement of the cable while positioned high above ground in an aerial bucket or while hanging from the pole. These prior art techniques are problematical. For example, if the guesstimate of the slack is too long, cable is wasted and, if a sufficient number of cable slack guesstimates are too long, there may not be sufficient overall cable length to finish the stringing of the cable along the poles of the intended installation route. On the other hand, if the guesstimate is too short at any particular terminal location, then there may not be sufficient slack cable to allow the subsequent splice to be properly made; the splice may be prone to failure because the glass fiber strands may break if the cable needs to be bent to, or beyond, its bending limits in order to accomplish the splice. Moreover, juggling a measuring device to measure a length of cable while hovering in an aerial bucket, or while hanging from a utility pole, may not be safe or convenient under all conditions. A better way of making a cable slack measurement under aerial installation conditions is needed. Applicant provides a solution to this problem of the prior art.

SUMMARY OF THE INVENTION

Embodiments of the present invention include methodology and apparatus for accurately and conveniently providing a pre-determined length of slack of a fiber optic cable.

The method includes wrapping the cable around a template which has receptacles for the cable. The template is pre-adjusted to provide the pre-determined length when the cable is wrapped a pre-determined number of times through the receptacles, providing a wrapped cable length. The wrapped cable length is clamped to the receptacles and tied in a manner to preserve that length when the clamps are removed. The clamps are removed thereby providing the pre-determined length of fiber optic cable slack. In a particular embodiment, the predetermined number of times is one time—i.e., one wrap. This methodology is particularly useful when the fiber optic cable is being strung from one utility pole to another, the slack of the fiber optic cable being deposited atop a utility pole.

The apparatus enables a lineman to make an accurate and convenient length measurement of a slack portion of a fiber optic cable during the stringing of the cable on utility poles, generally high above ground. The apparatus includes a centralized hub and a number of spokes or arms emanating from the hub in directions which are substantially coplanar. In other words, the spokes or arms lie in a plane, generally speaking. There are an equal number of clamps for clamping the cable in place, each one of the clamps being positioned at the end of a different one of the spokes. The lengths of all of the spokes with their respective clamps are equal to each other and are pre-determined to provide a suitable length of the slack portion of the fiber optic cable when all of the clamps engage the cable. As a result, a portion of the fiber optic cable is formed into a generally circular shape while being held by the clamps and the axial circumference of the portion is equivalent to the suitable length of the slack portion.

In further features of the present invention, the portion of fiber optic cable is tied in a manner to fix its length at the suitable length after removing the clamps from the cable, and that portion is stored at the top of one of the utility poles. The centralized hub includes a handle arranged to be grasped by the lineman while positioning the cable in the clamps. Or, the apparatus can be temporarily fastened to one of the poles, while the lineman is positioning the cable in the clamps, by a threaded bolt and nut combination, either the bolt or the nut being affixed to the pole and the other being affixed to the centralized hub. The length of each of the spokes can be adjusted. For example, the spokes can telescope, whereby the length of the spokes can be held in place by a pin inserted through holes in the telescoping spoke or by friction force as may be applied by a wing-nut on the telescoping spoke.

BRIEF DESCRIPTION OF THE DRAWINGS

FIG. 3 is an edge view of one clamp of FIG. 2 in an open state;

FIG. 4 is an edge view of the clamp of FIG. 3 in a closed state; and,

DETAILED DESCRIPTION OF THE PREFERRED EMBODIMENTS

Figure 1:
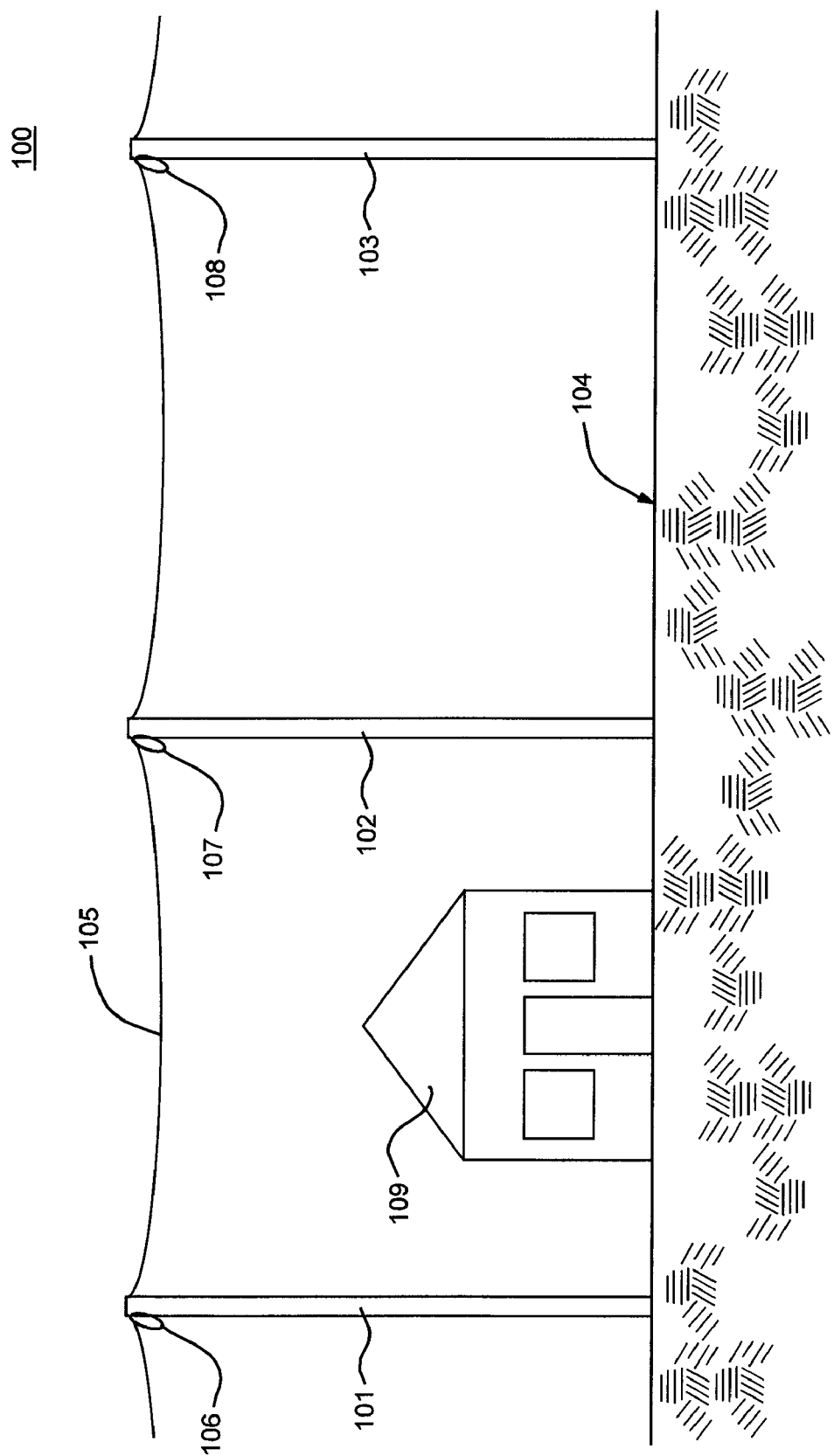
FIG. 1 depicts a series of utility poles supporting fiber optic cable in which the present invention is particularly useful.

Referring to FIG. 1, fiber-optic cable system 100 depicts a series of utility poles 101, 102 and 103 supporting fiber optic cable 105 above ground line 104, with which the present invention is particularly useful. It is to be understood that many utility poles can be used and is not limited to three in number. As can be seen at the top of each of the poles, there is a loop of cable slack shown, i.e., loops 106 atop pole 101, loop 107 atop pole 102 and loop 108 atop pole 103. The slack is needed for splicing purposes, to splice cable 105 with another cable (not shown) and thereby communicatively connect cable 105 to, e.g., house 109 via that other cable which is operatively-connected to the house.

The detail of how each slack loop is fastened to the pole top is not shown, but in a particular embodiment, there may be another cable or bare strand (not shown) used specifically for support. The support cable may also run from pole-top to pole-top in a manner similar to fiber optic cable 105 and, in such a case, would then be used to support fiber optic cable 105 in each span between adjacent poles. Alternatively, the support cable may be individually deployed at each pole-top. The slack loop may be direct lashed to this support cable. A lineman, or technician, or cable installer either climbs each pole or uses an aerial bucket to achieve pole-top height and access.

Figure 2:
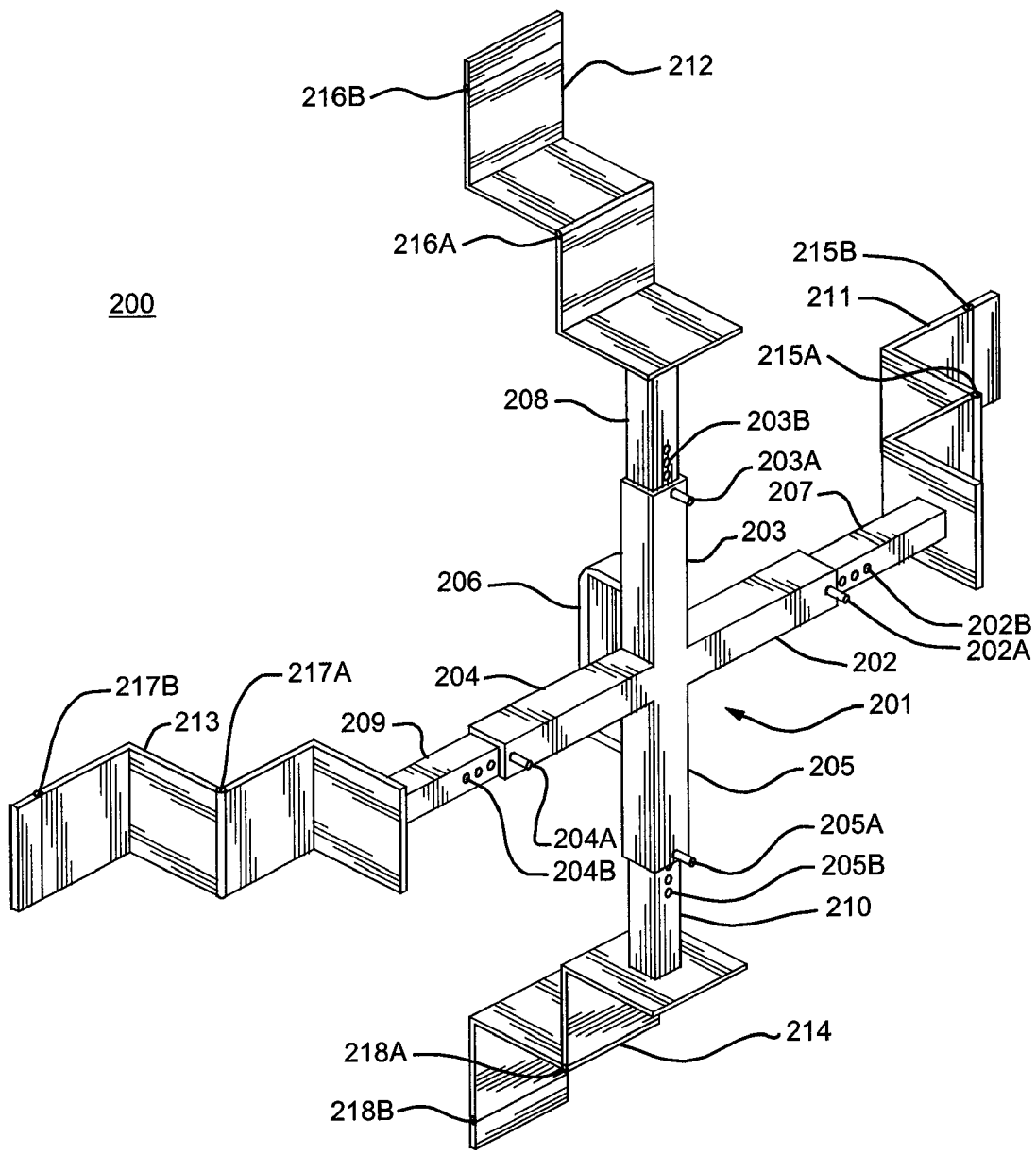
FIG. 2 is a perspective view of the apparatus of the present invention showing clamps at the ends of the extendible arms of the apparatus in an open condition.

Referring to FIG. 2, a fiber-optic cable slack measuring device 200 is depicted in perspective view. Centralized hub 201 is formed from fixed-length arms or spokes 202 203, 204 and 205. Handle 206 is affixed to centralized hub 201. Slideable spokes or arms 207, 208, 209 and 210 nest or telescope into and out from fixed arms 202, 203, 204 and 205 respectively. Slideable spokes can be held in place by pins inserted in holes, such as pins 202A, 203A, 204A and 205A, inserted in holes 202B, 203B, 204B and 205B, respectively.

Permanently affixed to the ends of slide-able spokes 207, 208, 209 and 210 are cable clamping mechanisms 211, 212, 213 and 214. Each cable clamping mechanism comprises a square-shaped or rectangular-shaped aperture when closed shut and includes two hinged axes of rotation. That is, clamping mechanism 211 includes hinges 215A and 215B, clamping mechanism 212 includes hinges 216A and 216B, clamping mechanism 213 includes hinges 217A and 217B and clamping mechanism 214 includes hinges 218A and 218B. Using clamping mechanism 212 at the top of FIG. 2 as an illustrative example, there is rotational motion of a portion of clamping mechanism 212 around the axis formed by hinge 216A. There is also rotational motion of a portion of clamping mechanism 212 around the axis formed by hinge 216B.

Referring to FIGS. 3 and 4, clamping mechanism 212 is shown schematically in edge view in open and closed states or positions, respectively. In FIG. 3, clamp floor 301 and clamp wall 302 are fixedly connected to each other and to extendible arm 208. They can all be formed from one-piece metal or hard plastic construction. Clamp ceiling 303 and clamp wall 304 are also fixedly connected to each other and can also be formed from one piece metal or hard plastic construction and they rotate about hinge 216A. Rotatable latch 305 is hinged to clamp wall 304 at hinge 216B and rotates about the axis of that hinge.

Referring to FIG. 4, clamping mechanism 212 is shown in a closed position, as it might be used in holding fiber optic cable 105 in place. Optical fiber 105 is shown in cross section within clamp 212. In this closed position, the inner dimensions of clamping mechanism 212 are proper for snugging cable 305 therein without crushing or damaging the cable. The cable can fall within the clamping mechanism along a clamping mechanism diagonal as shown, (or the clamping mechanism can be configured to snug the cable in a non-diagonal manner, as shown in FIG. 5, to be discussed hereinbelow).

Rotatable latch 305 closes against clamp floor 301 as shown to hold clamping mechanism 212 in a closed state by any one of several techniques. Latch 305 can be magnetic if clamping mechanism 212 is constructed from metal, whereby magnetic force can hold clamping mechanism 212 in a closed state. Alternatively, latch 305 can be spring-loaded to apply friction force to hold clamping mechanism 212 in a closed state. As another alternative, a tongue and groove (not shown) can be used between latch 305 and clamp floor 301 to keep latch 305 in place. If constructed from plastic, a button snap could be fashioned on latch 305 to connect with a mate on clamp floor 301 to keep latch 305 in place. Other means can also be used.

Figure 5:
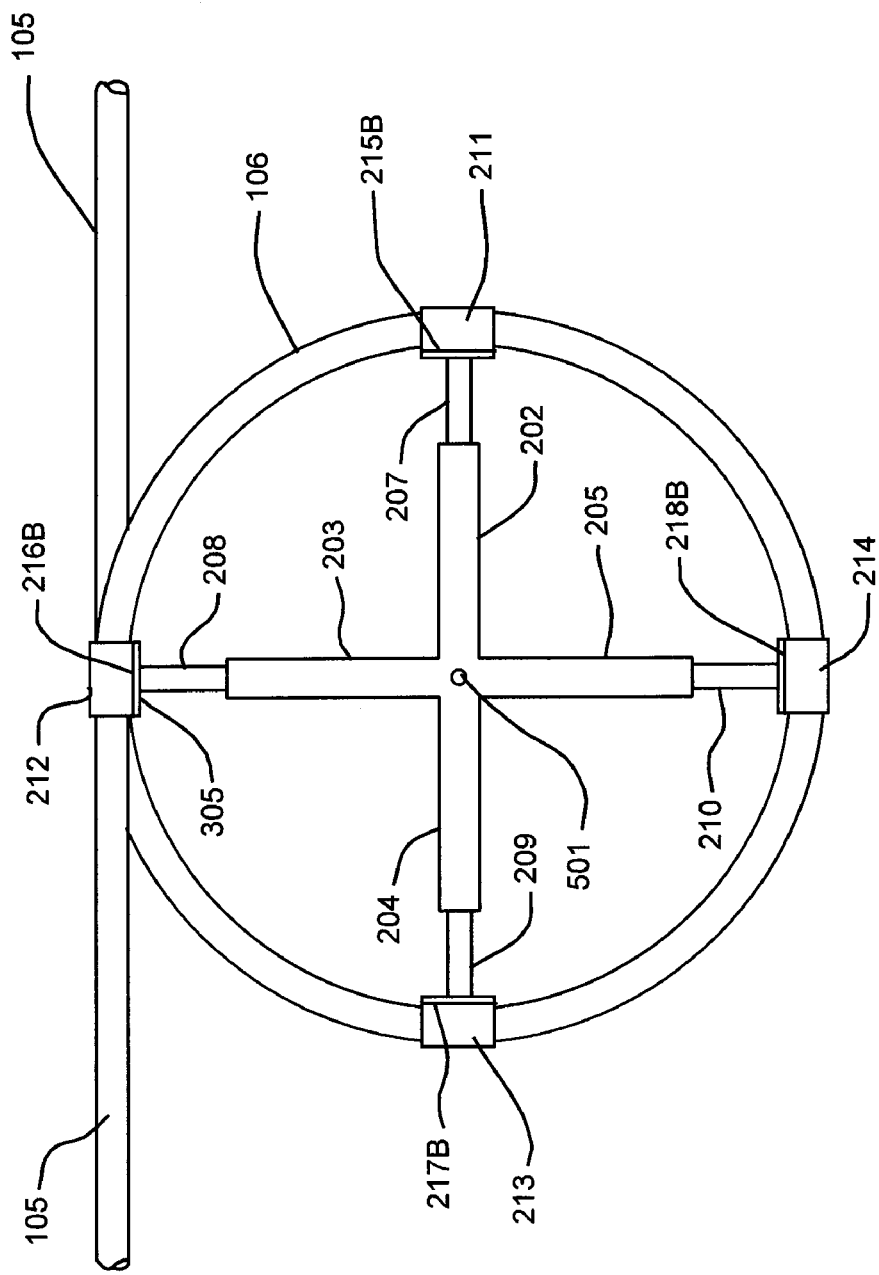
FIG. 5 is the apparatus of FIG. 2 shown supporting a fiber optic cable with clamps in their closed state.

Referring to FIG. 5, fiber optic cable 105 is shown in the circular shape that it would naturally form when engaging template or apparatus 200. In this Figure, the clamping apertures when in a closed state are only large enough for cable 105 to be held in a side-by-side configuration, as contrasted with the diagonal configuration of FIG. 4. Temporary fastening means 501 is shown centrally-located in the centralized-hub portion of apparatus 200, and can represent, a threaded bolt for connection to a like threaded nut on the pole, or some other fastening mechanism, like a hook or an eye for operation with a hook and eye mechanism. Handle 206 is not visible in this view. In clamping mechanism 212, the edge of latch 305 and hinge 216B are visible in this view in the closed state. The other clamps show hinges 215B, 217B and 218B.

Referring to FIG. 2 and FIG. 5 together, the pole to which cable slack measuring device 200 is temporarily connected is located on the side opposite handle 206. Therefore, if temporary mounting to the pole is used by the technician, in order to provide easy access to open and close clamping mechanisms 212 and 214, device 200 can be affixed to the pole in a manner so that it is oriented relative to the vertical pole, e.g., approximately forty-five degrees, so that spokes 203 and 205 are not vertical and not obstructed by the pole. The hook and eye mechanism can be configured a manner to automatically provide that approximate forty-five degree orientation for the device.

In operation, a lineman (not shown in the Figures) would position himself or herself at the top of a utility pole, such as pole 107 and would either hold apparatus 200 by handle 206 or would fasten apparatus 200 to the utility pole by any of the temporary fastening means discussed above. Then the lineman would wrap cable 105 once through clamps 211, 212, 213, and 214 to achieve the configuration shown in FIG. 5. Then the lineman would close all four clamps, with only clamp 212 containing two thicknesses of cable 105 as shown in cable cross-section in FIG. 4. The pressure or friction imposed on cable 105 by clamp 212 prevents the cable from moving while the lineman then tightly lashes or tapes the circular configuration together and then lashes or tapes it to either the pole atop which this activity is taking place or to a support cable attached to the top of this pole. After these lashings, the lineman removes template 200 by opening up all four clamps, leaving behind a length of cable slack which is optimum for splicing purposes for the particular cable being strung. It is not important that the configuration maintains a circular shape after template 200 is removed, although the resilience and flexibility of the cable tends to keep the slack in a generally circular shape.

In a particular instance, a five (5) foot cable slack length is optimum, and this is achieved by adjusting movable arms 207, 208, 209 and 210 to positions where the distance from the middle of clamp 212 to the middle of clamp 214, and where the distance from the middle of clamp 211 to the middle of clamp 213, is approximately nineteen (19) inches. The familiar theorem for the circumference of a circle is relied upon where the circumference is equal to "ΠD." "Π" is the familiar Greek letter identifying a constant relating to circles and having value of approximately 3.14, and where "D" is the diameter of the circle. This would produce an approximate sixty (60) inch (i.e., five foot) circumference which would then provide the sought-after five foot length of slack.

Variations and alternative embodiments of this fiber optic cable slack measuring device informally dubbed the "Coilbeeler" are contemplated, and can be made without departing from the spirit and scope of the present invention as defined in the appended claims. The present embodiments are to be considered in all respects as illustrative and not restrictive. The scope of the invention, therefore, is indicated by the appended claims rather than by the foregoing description, and all changes which come within the meaning and range of equivalency of the claims are therefore intended to be embraced therein.

What is claimed is:

1. Apparatus for enabling a lineman to make an accurate and convenient length measurement of a slack portion of a fiber optic cable during the stringing of said cable on utility poles above ground, said apparatus comprising:
    a centralized hub;
    a plurality of spokes emanating from said hub in directions which are substantially coplanar; and
    a like plurality of clamps for clamping said cable in place, each one of said clamps being positioned at the end of a different one of said spokes, the lengths of all of said spokes with their respective clamps being equal to each other and being pre-determined to provide a suitable length of said slack portion of said fiber optic cable when said plurality of clamps engages said cable;
    whereby a portion of said fiber optic cable is formed into a generally circular shape while being held by said plurality of clamps and the axial circumference of said position is equivalent to said suitable length of said slack portion and;
    lash or tape for tying said portion in a manner to fix the length of said portion at said suitable length after removing said clamps from said cable.

2. The apparatus of claim 1 further comprising:
    means for storing said portion at the top of one of said utility poles.

3. The apparatus of claim 1 wherein said hub further comprises:
    a handle arranged to be grasped by said lineman while positioning said cable in said clamps.

4. The apparatus of claim 1 wherein said hub further comprises:
    means for temporarily fastening said apparatus to one of said poles while said lineman is positioning said cable in said clamps.

5. The apparatus of claim 4 wherein said fastening means comprises:
    a hook and eye mechanism configured to orient said plurality of spokes in a particular orientation relative to said one of said poles.

6. The apparatus of claim 4 wherein said fastening means comprises:
    a threaded-bolt to be threaded into a like-threaded nut, said nut being affixed to, or formed from, the utility pole.

7. the apparatus of claim 4 wherein said fastening means comprises:
    a threaded-nut to he threaded onto a like-threaded bolt, said bolt being affixed to the utility pole.

8. The apparatus of claim 1 wherein each one of said plurality of spokes comprises:
    means for adjusting length of said each one said spokes.

9. The apparatus of claim 8 wherein said length adjusting means comprises:
    a telescoping spoke held in place by a pin inserted through holes in the telescoping spoke.

10. The apparatus of claim 8 wherein said length adjusting means comprises:
    a telescoping spoke held in place by a wing-nut providing friction force on the telescoping spoke.

11. A method for accurately and conveniently providing a pre-determined length of slack of a fiber optic cable, said in method comprising:
    wrapping said cable around a template having receptacles for said cable, said template being pre-adjusted to provide said pre-determined length when said cable is wrapped a predetermined number of times through said receptacles, thereby providing a wrapped cable length;
    clamping said wrapped cable length to said receptacles;
    tying said wrapped cable length in a manner to preserve said wrapped cable length when said clamps are removed; and
    removing said clamps and thereby providing said predetermined length of slack of said fiber optic cable.

12. The method of claim 11 wherein said predetermined number of times is once.

13. The method of claim 12 wherein said fiber optic cable is being strung from one utility pole to another, and said slack of said fiber optic cable is deposited atop said one utility pole.

14. Apparatus for providing a predetermined length of cable slack comprising:
    a template having receptacles for receiving said cable slack;
    means for holding said cable slack in said receptacles after said cable slack is positioned in said receptacles;
    means for fixing said cable slack in said receptacles at said predetermined length; and
    means for removing said cable slack having said predetermined length from said holding means.

15. Apparatus for enabling a lineman to make an accurate and convenient length measurement of a slack portion of a fiber optic cable during the stringing of said cable on utility poles above ground, said apparatus comprising:
    a centralized hub including a handle arranged to be grasped by said lineman while positioning said cable in said clamps;
    a plurality of spokes emanating from said hub in directions which are substantially coplanar; and
    a like plurality of clamps for clamping said cable in place, each one of said clamps being positioned at the end of a different one of said spokes, the lengths of all of said spokes with their respective clamps being equal to each other and being pre-determined to provide a suitable length of said slack portion of said fiber optic cable when said plurality of clamps engages said cable;
    whereby a portion of said fiber optic cable is formed into a generally circular shape while being held by said plurality of clamps and the axial circumference of said portion is equivalent to said suitable length of said slack portion.

16. Apparatus for enabling a lineman to make an accurate and convenient length measurement of a slack portion of a fiber optic cable during the stringing of said cable on utility poles above ground, said apparatus comprising:

a centralized hub;

a plurality of spokes emanating from said hub in directions which are substantially coplanar;

a like plurality of clamps for clamping said cable in place, each one of said clamps being positioned at the end of a different one of said spokes, the lengths of all of said spokes with their respective clamps being equal to each other and being pre-determined to provide a suitable length of said slack portion of said fiber optic cable when said plurality of clamps engages said cable; and said hub including a fastening mechanism for temporarily fastening said apparatus to one of said poles while said lineman is positioning said cable in said clamps;

whereby a portion of said fiber optic cable is formed into a generally circular shape while being held by said plurality of clamps and the axial circumference of said portion is equivalent to said suitable length of said slack portion.

* * * * *

UNITED STATES PATENT AND TRADEMARK OFFICE
CERTIFICATE OF CORRECTION

| | | |
|---|---|---|
| PATENT NO. | : 7,376,326 B2 | Page 1 of 1 |
| APPLICATION NO. | : 11/458717 | |
| DATED | : May 20, 2008 | |
| INVENTOR(S) | : Corbeels | |

It is certified that error appears in the above-identified patent and that said Letters Patent is hereby corrected as shown below:

THE TITLE PAGE PLEASE DELETE ITEM (54) AND COLUMN 1 LINES 1-2 AND INSERT ITEM (54) AND COLUMN 1 LINE 1-2 AS – FIBER OPTIC CABLE SLACK MEASURING DEVICE

Signed and Sealed this

Twenty-first Day of April, 2009

JOHN DOLL
*Acting Director of the United States Patent and Trademark Office*